United States Patent [19]

Kalmanash

[11] 4,337,421
[45] Jun. 29, 1982

[54] SEQUENTIAL COLOR SWITCH FOR BEAM PENETRATION CRT

[75] Inventor: Michael H. Kalmanash, Fairfield, Conn.

[73] Assignee: United Technologies Corporation, Hartford, Conn.

[21] Appl. No.: 259,344

[22] Filed: May 1, 1981

[51] Int. Cl.³ .............................................. H01J 29/80
[52] U.S. Cl. ........................................ 315/375; 358/73
[58] Field of Search ..................... 315/375; 358/72, 73

[56] References Cited

U.S. PATENT DOCUMENTS

| | | |
|---|---|---|
| 3,492,416 | 1/1970 | Weber . |
| 3,863,097 | 1/1975 | Labudda . |
| 3,887,838 | 6/1975 | Thurston . |
| 3,906,333 | 9/1975 | Kalmanash ......................... 315/411 |
| 3,914,617 | 10/1975 | Corbel ................................... 358/73 |
| 4,092,566 | 5/1978 | Chambers et al. . |
| 4,104,564 | 8/1978 | Cohen et al. . |
| 4,151,444 | 4/1979 | Jenness . |
| 4,281,272 | 7/1981 | Spilsbury ............................ 358/73 |

Primary Examiner—Theodore M. Blum
Attorney, Agent, or Firm—Richard P. Lange

[57] ABSTRACT

An improved sequential color switch for a beam penetration CRT includes a high voltage power supply and a high voltage transformer. A feedback circuit senses the DC level in the signal waveform applied to the transformer and feeds it back to the input of a driver. A low-pass filter connected to the input of the driver also senses the DC level in the signal waveform applied to the driver and adjusts the reference input of the high voltage power supply to correspondingly change its DC high voltage output level. Essentially, this removes any DC level from the primary winding of the high voltage transformer while at the same time adjusting the output level of the high voltage power supply connected to the secondary winding of the transformer by an amount which is proportional to the average DC level of the input signal waveform.

9 Claims, 2 Drawing Figures

SEQUENTIAL COLOR SWITCH FOR BEAM PENETRATION CRT

DESCRIPTION

Technical Field

This invention relates to a high voltage color switch for use with a beam penetration-type tube, and more particularly, to a small, inexpensive voltage switch for changing the voltage level of the accelerating anode of a color penetration-type CRT.

Background Art

A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT strikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increased the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it is possible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest in U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube. This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a small, low cost, high voltage color switch for a beam penetration CRT which has a relatively short reset period between each write period.

A particular feature of the high voltage color switch for a beam penetration CRT according to the present invention is that the electrical charge stored on the anode of the CRT can be quickly changed so that the displayed color can be switched to a different color after a short reset period.

An advantage of the high voltage color switch for a beam penetration color CRT according to the present invention is that it conserves energy and has a relatively small amount of heat dissipation. Because it consumes a small amount of electrical energy due to its low heat dissipation, the size and weight of the color switch make it attractive for use in an aircraft cockpit, or the like.

According to the present invention, a high voltage color switch for a beam penetration CRT includes a high voltage power supply connected through a transformer secondary winding to the accelerating anode of the CRT. The primary winding of the high voltage transformer is coupled through a low-pass filter to ground. Color level information is presented to the primary winding of the high voltage transformer and is coupled to the secondary winding where it is combined with the high voltage DC level from the power supply, where it sets the various DC levels that are applied to the accelerating anode. A feedback loop senses the average voltage level on the primary winding and drives that average voltage level to zero. The DC voltage thus removed is applied to the CRT anode by adjusting the reference input to the high voltage power supply to change its DC high voltage output level.

The foregoing and other objects, features and advantages of the sequential color switch for a beam penetration CRT will become more apparent from the following description of a preferred embodiment and accompanying drawing.

BEST MODE FOR CARRYING OUT THE INVENTION

Figure 1:
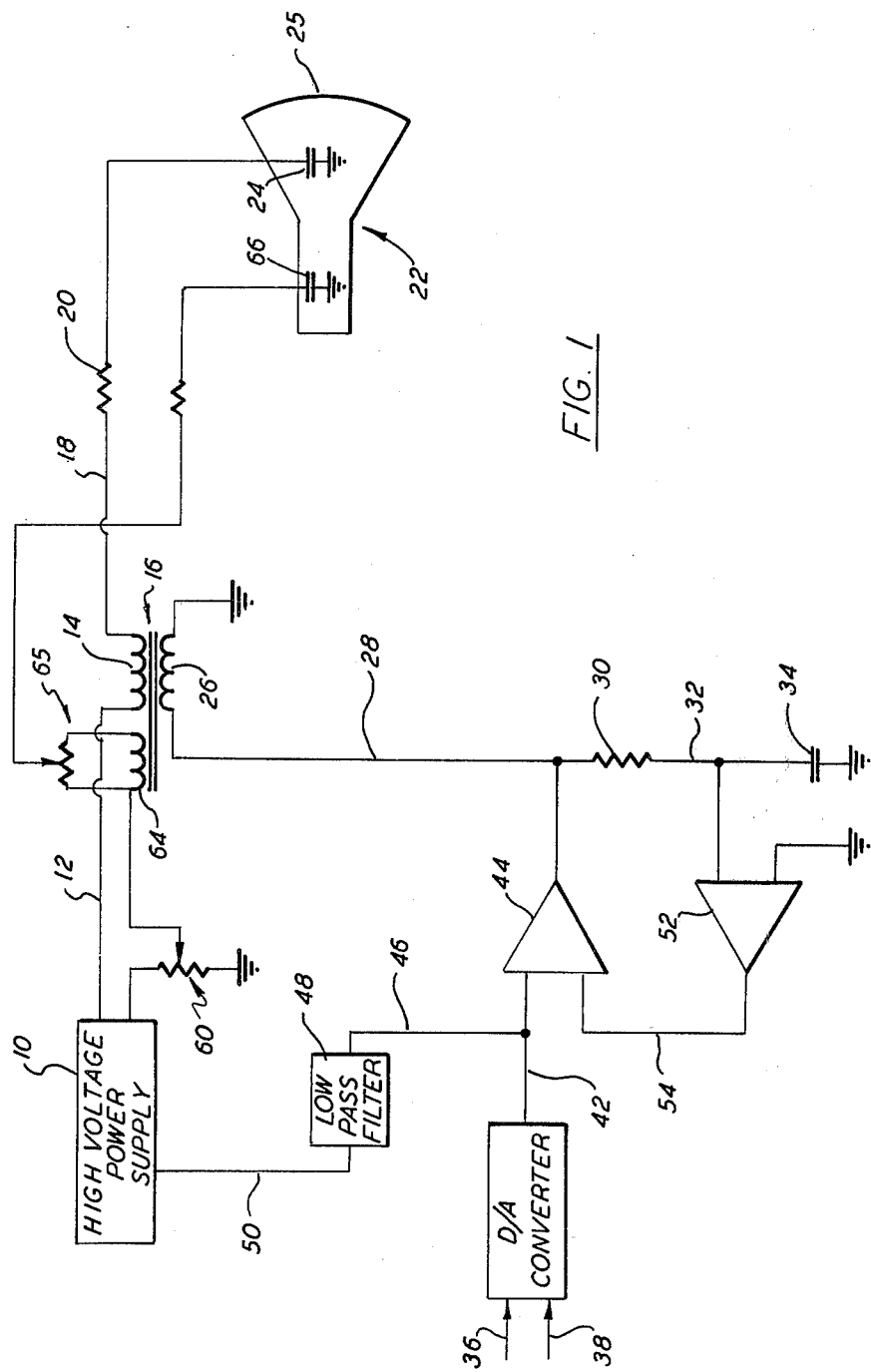
FIG. 1 is a schematic block diagram depicting one embodiment of the sequential color switch for a beam penetration CRT according to the present invention.

Referring initially to FIG. 1, there is seen one embodiment of the color sequential switch for a beam penetration CRT according to the present invention. A high voltage power supply 10 of a known type is provided and is connected by a line 12 to one side of a secondary winding 14 of a transformer 16. The other side of the secondary winding 14 is connected by a line 18 through a damping resistor 20 to a beam penetration CRT (cathode-ray tube) 22. As is known, the CRT 22 includes an anode 24 to which a high voltage is applied causing the beam of electrons emitted by a cathode (not shown) located in the tube neck to accelerate towards a faceplate 25 located across the front of the tube. The inner surface of the faceplate 25 typically has at least two layers of phosphor deposited thereon, each layer emitting a distinct wavelength or color of light in response to being excited by the electron beam. For the purposes of appreciating the present invention, it will be assumed that there is one layer of green phosphor and one layer of red phosphor on the inner surface of the faceplate 25, but it should be understood that phosphors which emit different colors could be used. Of course, there could be more than two layers of phosphor. As is known, the anode 24 is formed by a material of high conductivity that is positioned circumferentially around the CRT 22 near the front of the tube. Because of its large size, the anode 24 has a relatively high capacitance but, for the purposes of simplicity, is illustrated in the embodiment of FIG. 1 as a capacitor.

The transformer 16 also has a primary winding 26 and has a preselected step-up ratio that is matched to the characteristics of the circuit in known manner. For example, in a 1 to 1,000 turns ratio step-up transformer, a 4 V change across the primary winding 26 would result in a 4 KV change across the secondary winding 14, which if tied to ground would result in the uncorrected voltage swing of the secondary winding from $-2$ KV to $+2$ KV. In the present embodiment, one end of the primary winding 26 is connected to ground while the other end is connected by a line 28 to one side of resistor 30. A line 32 leads from the other end of the resistor 32 to one side of a capacitor 34, the other side of which is connected to ground. The resistor 30 and the capacitor 34 together act as a low-pass filter which essentially integrates the voltage waveform applied to the line 28 to the primary winding 26.

Incoming color information is presented to the high voltage color switch of the present invention on the lines 36 and 38 from an external source (not shown). Although there are numerous types of external sources, for the purposes of simplicity, the inputs to the color switch is assumed to be a signal of two digital bits which are capable of indicating which one of four colors are to be displayed by the CRT 22. The digital signal is presented to a D/A converter 40 which converts the digital bits into an analog-type signal at its output on the line 42 which can identify each one of the distinguishable four colors. One level will represent each color. The output signal from the D/A converter 40 is then presented to a driver, such as operational amplifier 44, to form a signal with waveforms that are suitable for driving the primary winding 26 of the transformer 16.

A particular feature of the present invention involves a feedback loop which senses the average (DC) level of the waveform presented to the primary winding 26 of the transformer 16 and then causes a corresponding adjustment in the output level of the driver 44 to maintain the DC level of the waveform presented to the primary winding 26 of the transformer 16 at zero. This feedback loop includes an operational amplifier 52 which has one of its input terminals coupled to the line 32 for sensing the DC component in the signal waveform applied to the primary winding 26. The other input terminal of the operational amplifier 52 is connected to ground. The output from the operational amplifier is connected via a lead 54 to an input of the operational amplifier 44.

Yet another feature of the present invention, discussed in greater detail hereinafter, concerns the adjustment of the high voltage DC level out of the high voltage power supply 10 in response to sensed DC level changes in line 42 out of the D/A converter, as could arise from color duty cycle variations. To perform this adjustment, a lead 46 is connected to a lead 42 to sense the output from the D/A converter 40 and this signal is presented to a low-pass filter 48. The low-pass filter 48 integrates this signal into a DC level and provides it via a line 50 to a reference terminal of the high voltage power supply 10 which proportionally changes the level of the output from the high voltage power supply 10.

A particular features of the present invention is that is also provides dynamic tracking color focus voltage for the CRT 22. In preferred form this includes a first potentiometer 60 which is coupled to the output of the high voltage power supply 10. This is a separate output which has a lower DC level than the output used to supply the anode voltage. The first potentiometer 60 is connected through a winding 62 which is an additional winding on the transformer 16 to a second potentiometer 64. The potentiometer 64 is used to provide dynamic adjustment to the voltage applied to the focus electrode 66 which is located near the front portion of the electron gun (not shown). Typically, the focus voltage level applied to the focus electrode is a fixed percentage level of the voltage applied to the anode 24. A particular feature of the present invention is that this focus system requires a minimum of additional parts, only a couple of potentiometers and the additional winding on the transformer 16. The first potentiometer 60 adjusts the DC baseline voltage level while the second potentiometer 64 adjusts the dynamic output to the level applied to the focus electrode 66.

Figure 2:
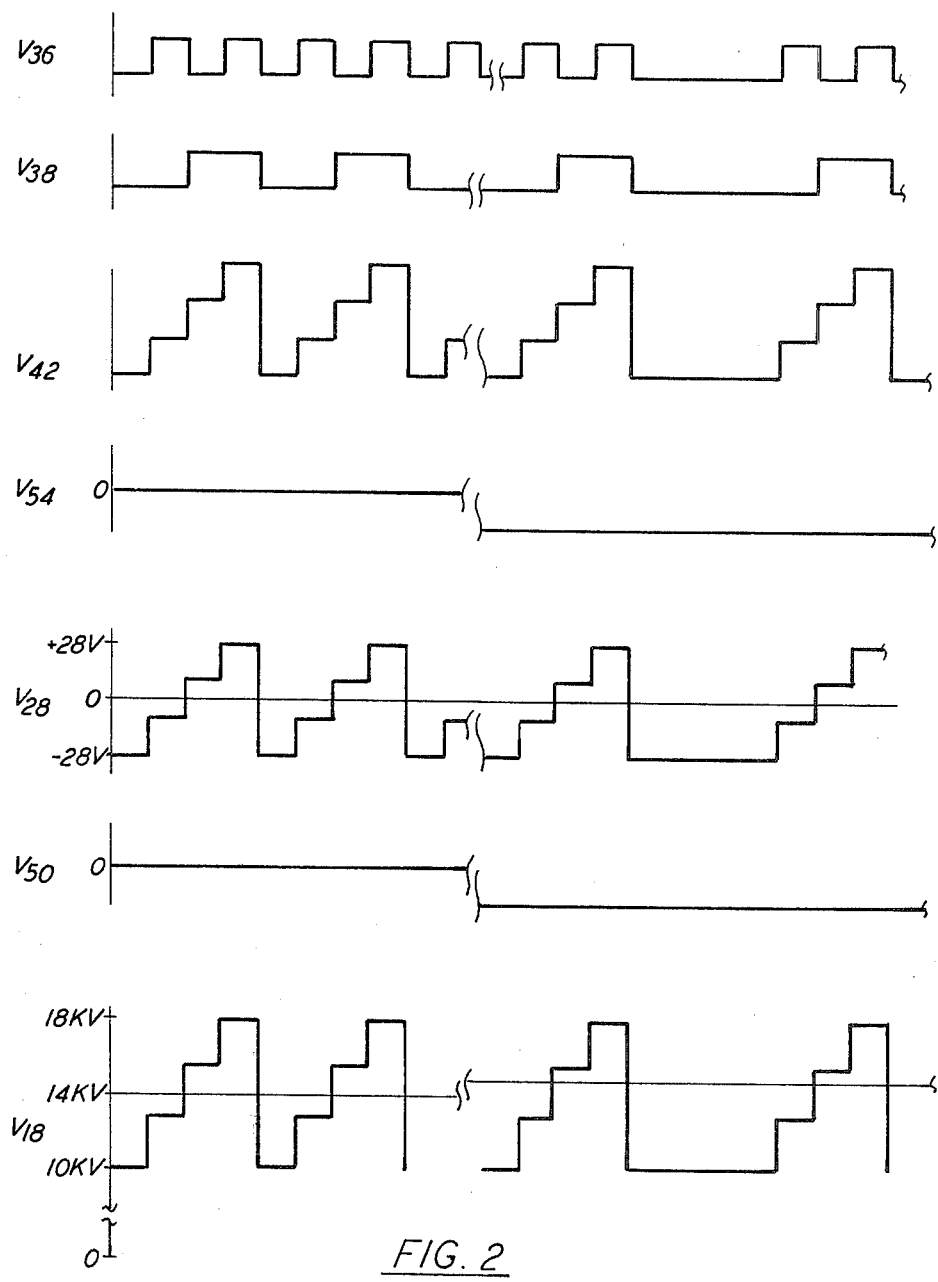
FIG. 2 is a diagram depicting steady state waveforms at various points in the embodiment of FIG. 1.

Referring now to FIG. 2, the operation of the sequential color switch according to the present invention will now be described. Referring first to the left-hand half of FIG. 2, there is seen a sequence in which the color switch is stepped through each of four colors while the voltage presented to the accelerating anode 24 is varied, for example, from 10 KV to 12 KV, from 12 KV to 16 KV, from 16 KV to 18 KV, and finally from 18 KV back to 10 KV. The duty cycle of this waveform is such that the dwell time at each voltage level is about the same so that there is no overall change in the DC level compared to a baseline of 14 KV.

Referring next to the right-hand half of FIG. 2, if the external source provides a digital signal indicating that a longer write period at one particular color is needed, e.g., a red color, such an unsymmetric waveform has a non-zero average DC level associated with it. It is known that DC voltage cannot be maintained across the primary winding 26. In accordance with the present invention, one terminal of the operational amplifier 52 is connected to line 32 to measure the voltage on the capacitor 34 which corresponds to the DC level of the primary winding 26. This is fed back through the drive circuit 44 to adjust the DC level of the signal waveform applied to the primary winding 26. In other words, the feedback loop drives the DC level of the voltage waveform applied to the line 28 to zero.

Since the secondary winding 14 also develops the same voltage waveform as in the primary winding, it will swing from a negative to a positive value about zero DC level. This will shift the discrete DC voltage levels applied to the accelerating anode 24 causing a color shift, as a function of color duty cycle. Thus, the low-pass filter 48 also senses the change in duty cycle of the waveform out of the D/A converter and thus applies a voltage level to the high voltage power supply 50 which proportionally adjusts the high voltage DC level out of the high voltage power supply 10. This restores to the accelerating anode 24 the DC level removed by the transformer 16.

Although this invention has been shown and described with respect to a preferred embodiment, it will be understood by those skilled in this art that various changes in form and detail thereof may be made without departing from the spirit and scope of the claimed invention.

I claim:

1. A high voltage color switch for a beam penetration cathode-ray tube in which a preselected voltage level is related to a particular color to be displayed on said cathode-ray tube, comprising:
   high voltage power supply means connectable to said cathode-ray tube and having an output voltage level selected to provide a first predetermined color on said cathode-ray tube;
   a transformer means connectable between the output of said high voltage power supply means and said beam penetration cathode-ray tube;
   driver means connected to said transformer for amplifying an input waveform received at an input terminal;
   feedback means coupled to said driver means to sense the DC level in said input waveform and to feed said DC level back to said input terminal of said driver means; and
   integration means connected to a reference terminal of said high voltage power supply to integrate said input waveform into a DC level and to provide a signal proportional thereto to said high voltage power supply for changing its output by an amount proportional to the DC level of said input waveform.

2. A high voltage color switch according to claim 1, wherein said transformer means includes a primary winding and a secondary winding, and wherein said primary winding is connected between the output of said driver means and a ground, and wherein said cathode-ray tube includes an anode to which the output of said high voltage power supply means is connected, and wherein said secondary winding of said transformer means is connected between the output of said high voltage power supply and said anode of said cathode-ray tube.

3. A high voltage color switch according to claim 2, wherein said feedback means is connected to the output of said driver means and includes a capacitor means which integrates the signal waveform applied to said primary winding of said transformer to a DC level.

4. A high voltage color switch according to claim 3, further including an operational amplifier connected between said capacitor and the input of said driver means for feeding back the DC level of the input signal waveform to the input of said driver means.

5. A high voltage color switch according to claim 1, wherein said integration means includes a low-pass filter which is connected between said input terminal of said driver means and the reference terminal of said high voltage power supply for adjusting the output voltage level of said high voltage power supply proportionally with respect to the DC level of said input waveform.

6. A high voltage color switch according to claim 1, wherein said cathode-ray tube includes a focus electrode to which a DC high voltage is applied to focus the electron beam for said beam penetration cathode-ray tube, and further including a means for providing a focus voltage that tracks the high voltage DC level applied to said anode of said cathode-ray tube.

7. A high voltage color switch according to claim 6, wherein said means for providing a focus voltage includes a focus voltage winding on said transformer means which is connected between said high voltage power supply and said focus electrode of said cathode-ray tube.

8. A high voltage color switch according to claim 7, wherein said means for providing a focus voltage includes a first potentiometer connected between said high voltage power supply and said focus winding of said transformer means for proportionally adjusting the voltage level from said high voltage power supply.

9. A high voltage color switch according to claim 8, wherein said means for adjusting the focus voltage further includes a second potentiometer coupled across the focus winding of said transformer means to proportionally adjust the voltage swing applied to said focus electrode.

* * * * *

UNITED STATES PATENT AND TRADEMARK OFFICE
CERTIFICATE OF CORRECTION

PATENT NO. : 4,337,421
DATED : June 29, 1982
INVENTOR(S) : MICHAEL H. KALMANASH

It is certified that error appears in the above—identified patent and that said Letters Patent is hereby corrected as shown below:

Column 1, after the Title, insert the following:

-- Cross Reference to Related Applications

The subject matter of this patent application is related to that disclosed in U.S. Patent Application Serial No. 259,342 filed May 1, 1981 by M. H. Kalmanash for RANDOM COLOR SWITCH FOR BEAM PENETRATION CRT; to U.S. Patent Application Serial No. 259,343 filed May 1, 1981 by M. H. Kalmanash for DUAL MODE COLOR SWITCH FOR BEAM PENETRATION CRT; to U.S. Patent Application Serial No. 259,381 filed May 1, 1981 by M. H. Kalmanash et al for DIFFERENTIAL RANDOM COLOR SWITCH FOR BEAM PENETRATION CRT; to U.S. Patent Application Serial No. 259,383 filed May 1, 1981 by M. H. Kalmanash for STROKE DURING RETRACE COLOR SWITCH; to U.S. Patent Application Serial No. 259,394 filed May 1, 1981 by M. H. Kalmanash for

UNITED STATES PATENT AND TRADEMARK OFFICE
CERTIFICATE OF CORRECTION

PATENT NO. : 4,337,421

DATED : June 29, 1982

INVENTOR(S) : MICHAEL H. KALMANASH

It is certified that error appears in the above—identified patent and that said Letters Patent is hereby corrected as shown below:

CONSTANT CURRENT BIAS COLOR SWITCH FOR A BEAM PENETRATION CRT; and to U.S. Patent Application Serial No. 284,831 filed July 20, 1981 by M. H. Kalmanash for MODUALR HIGH SPEED COLOR SWITCH, all of which are assigned to the same assignee as the present case. --

Column 4, line 51, "is" second occurrence should be -- it --

Signed and Sealed this

Fourteenth Day of September 1982

[SEAL]

Attest:

GERALD J. MOSSINGHOFF

Attesting Officer     Commissioner of Patents and Trademarks